(12) United States Patent
Nodera et al.

(10) Patent No.: US 7,829,617 B2
(45) Date of Patent: Nov. 9, 2010

(54) AROMATIC POLYCARBONATE RESIN COMPOSITION AND MOLDED OBJECT MADE FROM THE SAME

(75) Inventors: Akio Nodera, Chiba (JP); Yusuke Hayata, Chiba (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 457 days.

(21) Appl. No.: 11/817,364

(22) PCT Filed: Mar. 28, 2006

(86) PCT No.: PCT/JP2006/306341

§ 371 (c)(1),
(2), (4) Date: Aug. 29, 2007

(87) PCT Pub. No.: WO2006/109568

PCT Pub. Date: Oct. 19, 2006

(65) Prior Publication Data

US 2009/0061220 A1   Mar. 5, 2009

(30) Foreign Application Priority Data

Apr. 8, 2005  (JP) .............................. 2005-112594

(51) Int. Cl.
  *C08L 69/00* (2006.01)
(52) U.S. Cl. ........................ 524/423; 524/425; 524/430; 524/445; 524/449; 524/451; 524/455; 524/456; 524/504; 524/506; 525/63; 525/101; 525/104; 525/463; 525/464
(58) Field of Classification Search ........................ None
See application file for complete search history.

(56) References Cited

U.S. PATENT DOCUMENTS

| 2005/0261414 A1 | 11/2005 | Mitsuhashi et al. |
| 2009/0186207 A1* | 7/2009 | Hayata et al. ............... 428/220 |

FOREIGN PATENT DOCUMENTS

| EP | 990679 | * | 4/2000 |
| EP | 1475396 | * | 11/2004 |
| JP | 10-0168297 | | 6/1998 |
| JP | 10-0231416 | | 9/1998 |
| JP | 2000129110 | * | 5/2000 |

OTHER PUBLICATIONS

U.S. Appl. No. 12/097,889, filed Jun. 18, 2008, Hayata, et al.
U.S. Appl. No. 12/527,871, filed Aug. 20, 2009, Hayata.

* cited by examiner

*Primary Examiner*—David Buttner
(74) *Attorney, Agent, or Firm*—Oblon, Spivak, McClelland, Maier & Neustadt, L.L.P.

(57) ABSTRACT

There is provided an aromatic polycarbonate resin composition having excellent flame retardancy, mechanical properties and fluidity and affording a thin-walled molded article.

The aromatic polycarbonate resin composition includes a resin component containing (A) 90 to 99.5% by mass of an aromatic polycarbonate resin and (B) 10 to 0.5% by mass of a polyorganosiloxane-containing graft copolymer, and, compounded in 100 parts by mass of the resin component, (C) 0.1 to 5 parts by mass of a bisphenol type epoxy compound and (D) 0.05 to 2 parts by mass of polytetrafluoroethylene capable of forming fibrils, wherein the polyorganosiloxane-containing graft copolymer in the resin composition has a dispersion average particle diameter of 0.1 to 1.0 μm. The molded article has a section with a thickness of 1 mm or less and is obtainable by molding the aromatic polycarbonate resin composition.

10 Claims, No Drawings

AROMATIC POLYCARBONATE RESIN COMPOSITION AND MOLDED OBJECT MADE FROM THE SAME

TECHNICAL FIELD

The present invention relates to an aromatic polycarbonate resin composition and to a molded article using the resin composition. More specifically, the present invention is directed to an aromatic polycarbonate resin composition which has excellent flame retardancy, mechanical properties and fluidity and which is suited for forming a thin-walled molded article utilized in the field of OA appliances, electric and electronic appliances, etc., and to a molded article using such a resin composition.

BACKGROUND ART

Polycarbonate resins are widely utilized as materials for OA appliances, electric and electronic components, domestic appliances, construction parts, automobile parts, etc. because of their excellent impact resistance, heat resistance and electric characteristics. While polycarbonate resins have a higher flame retardancy as compared with polystyrene resins, much higher flame retardancy is required when used in the field of, particularly, OA appliances and electric and electronic components. In such a utilization, various flame retardants are added to the polycarbonate resins to improve the flame retardancy.

For example, organic halogen compounds and organic phosphorus compounds have been hitherto added. Most of these flame retardants, however, have a problem of their toxicity. In particular, organic halogen compounds have a problem that a corrosive gas is generated upon combustion. In this circumstance, there has been an increasing demand for imparting flame retardancy using non-halogen and non-phosphorus flame retardants in recent years.

As non-halogen type or non-phosphorus type flame retardants, various proposals have been made to use polyorganosiloxane compounds.

For example, Patent Document 1 discloses a flame retardant resin composition containing a thermoplastic resin and compounded therein a polyorganosiloxane-containing graft copolymer obtained by graft polymerizing a vinyl monomer to polyorganosiloxane particles of 0.2 µm or less. The flame retardant resin composition, however, has a problem that the balance between the flame retardancy and impact resistance is not good. Namely, while the impact resistance thereof is satisfactory to some degree, the flame retardancy thereof is insufficient.

In an attempt to solve the problem of Patent Document 1, Patent Document 2 proposes a polyorganosiloxane-containing graft copolymer obtainable by polymerizing (B) a polyfunctional monomer and a copolymerizable monomer other than the polyfunctional monomer in the presence of (A) polyorganosiloxane particles, and by further polymerizing (C) a vinyl monomer. A resin composition having excellent flame retardancy and impact resistance is disclosed to be obtainable by compounding the graft copolymer into a thermoplastic resin.

The polyorganosiloxane particles (A) contained in the graft copolymer have an average particle diameter of 0.008 to 0.6 µm. Such particles, when compounded in a polycarbonate resin, form aggregates of about 3 µm because of poor dispersibility. Therefore, the desired flame retardancy is not obtainable. Additionally, the proposed resin composition has a problem that the flame retardancy and the like properties of products obtained therefrom vary product to product.

Patent Document 3 discloses a resin composition which is attempted to improve the transparency and which contains a polycarbonate resin, an alkali metal salt of a perfluoroalkanesulfonic acid and a bisphenol type epoxy resin. The flame retardancy of the resin composition is, however, unsatisfactory, though the transparency is improved to some degree.

[Patent Document 1] JP-A-2000-264935
[Patent Document 2] JP-A-2003-238639
[Patent Document 3] JP-A-Hei 6 (1994)-73281

DISCLOSURE OF THE INVENTION

Problems to be Solved by the Invention

The present invention has been made to solve the above-described problems and is, among others, aimed at the provision of an aromatic polycarbonate resin composition which has high flame retardancy, mechanical properties and fluidity and which permits the formation of a molded article having a thickness as thin as 1 mm or less in response to recent demand for thin-walled products.

Means for Solving the Problems

The present inventors have made an earnest study with a view toward accomplishing the above object and have paid attention to the dispersibility of polyorganosiloxane-containing graft copolymer particles as a flame retarding component. As a result, it has been found that the particle size of aggregates of the flame retarding component in a polycarbonate resin composition can be controlled by addition of a specific amount of a bisphenol type epoxy compound and that the above problem can be solved.

Thus, the present invention provides:

(1) An aromatic polycarbonate resin composition comprising: a resin component containing 90 to 99.5% by mass of an aromatic polycarbonate resin (A) and 10 to 0.5% by mass of a polyorganosiloxane-containing graft copolymer (B), and, compounded in 100 parts by mass of the resin component, 0.1 to 5 parts by mass of a bisphenol type epoxy compound (C) and 0.05 to 2 parts by mass of polytetrafluoroethylene capable of forming fibrils (D), wherein the polyorganosiloxane-containing graft copolymer in the resin composition has a dispersion average particle diameter of 0.1 to 1.0 µm; and (2) A molded article having a section with a thickness of 1 mm or less and obtainable by molding an aromatic polycarbonate resin composition as recited in (1) above.

EFFECTS OF THE INVENTION

The resin composition of the present invention has a high flame retardancy of V-0 rating or V-1 rating in accordance with UL standard test using a wall thickness of 1/32 inch. Therefore, even when a high fluidity polycarbonate resin having a viscosity molecular weight of 13,000 to 18,000 is used, it is possible to obtain thin-walled molded bodies having a section with a thickness of 1 mm or less, films and sheets which are free of reduction of mechanical properties such as impact resistance and stiffness.

BEST MODES FOR CARRYING OUT THE INVENTION

The aromatic polycarbonate resin (A) used in the present invention (hereinafter occasionally referred to simply as component (A)) is not specifically limited. However, a polymer having repeating units of the following general formula (I) is suitably used:

[Chemical Fomula 1]

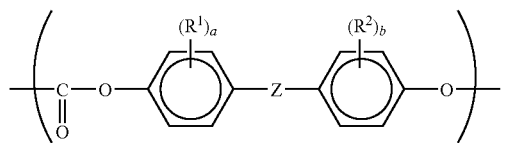

In the above general formula (I), $R^1$ and $R^2$ are each a hydrogen atom, a halogen atom (for example, chlorine, bromine, fluorine or iodine) or a $C_1$-$C_8$ alkyl group (for example, a methyl group, an ethyl group, a propyl group, a n-butyl group, an isobutyl group, an amyl group, an isoamyl group or a hexyl group), a and b are each an integer of 1 to 4. When there are a plurality of $R^1$ groups or a plurality of $R^2$ groups, they may be the same as or different from each other. The symbol Z represents a direct bond, a $C_1$-$C_8$ alkylene group or a $C_2$-$C_8$ alkylidene group (such as a methylene group, an ethylene group, a propylene group, a butylene group, a pentylene group, a hexylene group, an ethylidene group or an isopropylidene group), a $C_5$-$C_{15}$ cycloalkylene group or a $C_5$-$C_{15}$ cycloalkylidene group (such as a cyclopentylene group, a cyclohexylene group, a cyclopentylidene group or a cyclohexylidene group), a bond of —S—, —SO—, —$SO_2$—, —O— or —CO—, or a bond of the following formula (II) or formula (III):

[Chemical Formula 2]

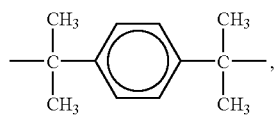

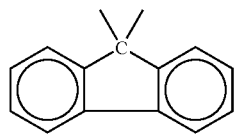

The above aromatic polycarbonate resin may be easily prepared by reacting a dihydric phenol represented by the general formula (IV) below with phosgene or a carbonate diester compound.

[Chemical Fomula 3]

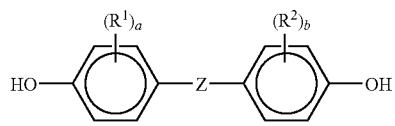

In the above formula (III), wherein $R^1$, $R^2$, Z, a and b have the same meaning as above.

For example, the polymer may be prepared by reaction of a dihydric phenol with a carbonate precursor such as phosgene in a solvent such as methylene chloride in the presence of a known acid acceptor and a known molecular weight modifier, or by transesterification of a dihydric phenol with a carbonate precursor such as diphenyl carbonate. A variety of dihydric phenols may be mentioned as the dihydric phenol of the above general formula (IV). Particularly, 2,2-bis(4-hydroxyphenyl)propane (generally called bisphenol A) is preferred.

Examples of the dihydric phenols other than bisphenol A include dihydroxydiarylalkanes such as bis(4-hydroxyphenyl)methane, bis(4-hydroxyphenyl)methane, 1,1-bis(4-hydroxyphenyl)ethane, 1-naphthyl-1,1-bis(4-hydroxyphenyl)ethane, 2,2-bis(3,5-dimethyl-4-hydroxyphenyl)propane, 1,1-bis(4-hydroxyphenyl)-3,3,5-trimethylcyclohexane, 2,2-bis(4-hydroxyphenyl)-1,1,1,3,3,3-hexafluoropropane; dihydroxydiarylsulfones such as bis(3-chloro-4-hydroxyphenyl)sulfone; dihydroxydiaryl ethers such as bis(3,5-dimethyl-4-hydroxyphenyl)ether; dihydroxydiaryl ketones such as 3,3',5,5'-tetramethyl-4,4'-dihydroxybenzophenone; dihydroxydiarylsulfides such as bis(3,5-dimethyl-4-hydroxyphenyl)sulfide; dihydroxydiarylsulfoxide such as bis(4-hydroxyphenyl)sulfoxide; dihydroxydiphenyls such as 4,4'-dihydroxydiphenyl; and dihydroxydiaryl fluorene such as 9,9-bis(4-hydroxyphenyl)fluorene.

As the carbonic diester compound, there may be mentioned, for example, diaryl carbonates such as diphenyl carbonate and dialkyl carbonates such as dimethyl carbonate and diethyl carbonate.

As the molecular weight modifier, various kinds of modifiers generally used for the production of polycarbonates may be used. Specific examples of the modifier include monohydric phenols such as phenol, p-cresol, p-tert-butylphenol, p-tert-octylphenol, p-cumylphenol, bromophenol, tribromophenol and nonylphenol.

The aromatic polycarbonate resin (A) used in the present invention preferably has a viscosity average molecular weight of 13,000 to 18,000, particularly preferably 14,000 to 17,000, from the standpoint of mechanical properties and moldability.

As the aromatic polycarbonate resin of the component (A), there may be used a polycarbonate-polyorganosiloxane block copolymer (PC-PDMS copolymer) composed of a polycarbonate moiety containing repeating units having a structure represented by the above formula (I) and a polyorganosiloxane moiety containing repeating units having a structure represented by the following general formula (V):

[Chemical Formula 4]

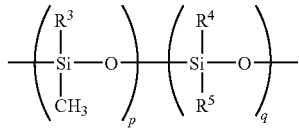

In the above formula (V), $R^3$, $R^4$ and $R^5$ may be same or different and are each a hydrogen atom, a $C_1$ to $C_6$ alkyl group (for example, a methyl group, an ethyl group, a propyl group, a n-butyl group, an isobutyl group, an amyl group, an isoamyl group or a hexyl group) or a phenyl group, and p and q are each 0 or an integer of 1 to 10.

The PC-PDMS copolymer preferably has a viscosity average molecular weight of 10,000 to 40,000, particularly preferably 15,000 to 35,000. The ratio (ratio by mass) of the polycarbonate moiety to the polyorganosiloxane moiety of the PC-PDMS copolymer is 50:50 to 99.9:0.1, preferably 60:40 to 99.5:0.5.

Such PC-PDMS copolymer is described in detail in JP-A-Hei 6 (1994)-100684.

In the present invention, the aromatic polycarbonate resin of the component (A) can contain 10 to 90 mass %, preferably 15 to 70 mass %, of a branched polycarbonate (branched PC). As a branching agent for obtaining such branched PC may be, for example, fluoroglycin, mellitic acid, trimellitic acid and its chloride and anhydride, gallic acid and its ester, pyromellitic acid and its anhydride, resorcinic acid, resorcinaldehyde, trimethyl chlorides, 4-chloroformylphthalic anhydride, benzophenonetetracarboxylic acid, hydroxybenzophenones, hydroxyphenyl ethers, hydroxydiphenylmethanes and hydroxylflavans.

Further, the polycarbonate resin (A) can be a copolymer containing comonomer units of a straight-chain aliphatic dicarboxylic acid, such as adipic acid, pimelic acid, suberic acid, azelaic acid, sebacic acid or decanedicarboxylic acid.

The above-described component (A) may be used singly or in combination of two or more thereof.

The polyorganosiloxane-containing graft copolymer (B) used in the present invention (hereinafter occasionally referred to simply as component (B)) is not specifically limited. As one specific example of the preferred component (B), there may be mentioned a polyorganosiloxane-containing graft copolymer obtainable by polymerizing 0.5 to 10 parts by mass of vinyl monomers (F) composed of 100 to 50 mass % of a polyfunctional monomer (f-1) and 0 to 50 mass % of other copolymerizable monomer (f-2) in the presence of 40 to 90 parts by mass of polyorganosifoxane particles (E), and by further polymerizing 5 to 50 parts by mass of a vinyl monomer (G) (a total of (E), (F) and (G) is 100 parts by mass).

A more preferred component (B) is a copolymer obtainable by polymerizing 1 to 5 parts by mass of a vinyl monomer (F) in the presence of 60 to 80 parts by mass of polyorganosiloxane particles (E), and by further polymerizing 15 to 39 parts by mass of a vinyl monomer (G). Details of the component (B) are described in JP-A-2003-238639.

The average particle diameter of the component (B) is suitably 0.1 to 1.0 μm as determined by electron microscopy. It may be difficult to obtain in a stable manner polyorganosiloxane particles having an average particle diameter of less than 0.1 μm. When the average particle diameter exceeds 1.0 μm, the flame retardancy tends to be low.

The above-described component (B) may be used singly or in combination of two or more thereof.

In the resin composition of the present invention, the compounding amounts of the component (A) and component (B) are 90 to 99.5 mass % (A) and 10 to 0.5 mass % (B), respectively, preferably 92 to 99 mass % (A) and 8 to 1 mass % (B), respectively. When the compounding amount of the component (B) is less than 0.5 mass % (i.e. when the compounding amount of the component (A) exceeds 99.5 mass %), not only the flame retardancy but also the impact resistance is deteriorated. When the compounding amount of the component (B) exceeds 10 mass % (i.e. when the compounding amount of the component (A) is lower than 90 mass %), not only the flame retardancy but also the stiffness is deteriorated.

It is important that the epoxy compound (C) used in the present invention should be bisphenol type epoxy compound. Other epoxy compounds such as a novolak type epoxy resin cannot sufficiently disperse the component (B).

The bisphenol type epoxy resin compound (C) (hereinafter occasionally referred to simply as component (C)) is not specifically limited. Commercially available bisphenol type epoxy resin compound may be suitably used. Specific example of the component (C) include a bisphenol A type epoxy compound, a bisphenol F type epoxy compound, a bisphenol S type epoxy compound, a bisphenol AD type epoxy compound and halogenated derivatives of these epoxy compounds. Above all, bisphenol A type epoxy resin is particularly preferred. The epoxy compound preferably has an epoxy equivalent of 180 to 3,500, more preferably 180 to 400.

These epoxy compounds may be represented by the following general formula (VI):

[Chemical Formula 5]

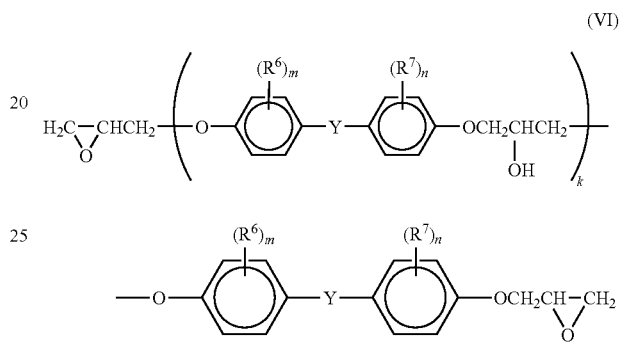

(VI)

In the above formula (VI), Y represents a $C_1$ to $C_8$ alkylene group, a $C_2$ to $C_8$ alkylidene group, a $C_5$ to $C_{15}$ cycloalkylene group, a $C_5$ to $C_{15}$ cycloalkylidene group, a direct bond, a bond of —$SO_2$—, —SO—, —S—, —O— or —CO—, or a bond of the following formula:

[Chemical Formula 6]

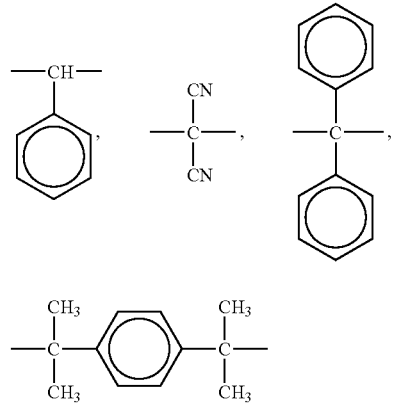

In the above formula (VI), part or all of the hydrogen atoms of the group Y may be substituted with a halogen atom or atoms. The groups $R^6$ and $R^7$ may be the same or different and each represent a hydrogen atom, a halogen atom or $C_1$ to $C_8$ alkyl group. The symbols m and n are each an integer of 1 to 4. When m and n are plural, plural $R^6$ and plural $R^7$ may be different from each other. The symbol k is 0 or an integer of 1 or more.

The above-described component (C) may be used singly or in combination of two or more thereof.

The compounding amount of the component (C) is 0.1 to 5 parts by mass per 100 parts by mass of the resin component composed of the components (A) and (B). A compounding amount of the component (C) below 0.1 part by mass is insufficient to obtain satisfactory effect for dispersing the component (B). When the compounding amount of the component (C) exceeds 5 parts by mass, the viscosity of the resin composition is so high that the moldability becomes no good.

The polytetrafluoroethylene capable of forming fibrils (D) used in the present invention (hereinafter occasionally referred to simply as component (D)) is not specifically limited as long as it has a capability of forming fibrils. The term "capability of forming fibrils" as used herein is intended to refer to a tendency of a resin to combine with each other to become a fibrous form upon receipt of an external action such as a shearing force.

The polytetrafluoroethylene capable of forming fibrils can impart a melt-drop preventing effect to the resin composition of the present invention and permits the resin composition to exhibit excellent flame retardancy.

Specific examples of the component (D) include polytetrafluoroethylene, tetrafluoroethylene copolymers (e.g., a tetrafluoroethylene/hexafluoropropylene copolymer). Of these, polytetrafluoroethylene (hereinafter occasionally referred to as "PTFE") is preferred.

PTFE capable of forming fibrils has an extremely high molecular weight. The number average molecular weight of PTFE as determined from the standard specific gravity thereof is generally at least 500,000, preferably 500,000 to 15,000,000, more preferably 1,000,000 to 10,000,000. Such PTFE can be obtained by, for example, polymerizing tetrafluoroethylene in an aqueous medium in the presence of sodium, potassium or ammonium peroxydisulfide under a pressure of 1 to 100 psi at a temperature of 0 to 200° C., preferably 20 to 100° C. Such PTFE can be used not only in the form of a solid but also in the form of an aqueous dispersion.

As PTFE capable of forming fibrils, there may be used, for example, those classified in Type 3 according to ASTM Standards. Specific examples of commercially available PTFE classified in Type 3 include TEFLON 6-J (Trade Name; manufactured by DuPont—Mitsui Fluorochemicals Co., Ltd.) and POLYFLON D-1 and POLYFLON F-103 (both Trade Names; manufactured by Daikin Industries Ltd.). As PTFE other than those of Type 3, there may be mentioned ARGOFLON F5 (Trade Names; manufactured by Montefluos S.P.A.) and POLYFLON MPA FA-100 (Trade Name; manufactured by Daikin Industries Ltd.).

The component (D) may be used singly or in combination of two or more thereof.

The compounding amount of the component (D) is 0.05 to 2 parts by mass, preferably 0.1 to 1.5 parts by mass, per 100 parts by mass of the resin component composed of the components (A) and (B). A compounding amount of the component (D) less than 0.05 part by mass is insufficient to obtain the desired melt-drop preventing effect. Too large a compounding amount in excess of 2 parts by mass not only adversely affects the impact resistance and moldability (appearance of molded article) of the resin composition but also undesirably causes difficulty in the stable production of pellets due to pulsation of extruded strands at the time of kneading-extrusion.

In addition to the above components (A) to (D), other synthetic resins, elastomers, various kinds of inorganic fillers, additives, etc. may be further incorporated into the polycarbonate resin composition of the present invention as long as the objects of the present invention are not adversely affected.

As other synthetic resins, there may be mentioned polyethylene, polypropylene, poly(methyl methacrylate) and polycarbonate other than the component (A). As the elastomers, there may be mentioned an isobutylene-isoprene rubber, a styrene-butadiene rubber, an ethylene-propylene rubber and an acrylic elastomer.

The inorganic filler is incorporated for the purpose of improving the mechanical properties and durability of the thermoplastic resin composition as well as for extending purpose. Examples of the filler include glass fibers (GF), glass beads, glass flakes, carbon black, calcium sulfate, calcium carbonate, calcium silicate, titanium oxide, alumina, silica, asbestos, talc, clay, mica and quartz powder.

As the additives, there may be mentioned, for example, antioxidants such as those of a hindered phenol type, a phosphorus type and an amine type; UV absorbing agents such as those of a benzotriazole type and a benzophenone type; external lubricants such as those of an aliphatic carboxylic ester type and a paraffin type; releasing agents; antistatic agents; and coloring agents.

Illustrative of suitable hindered phenol type antioxidants are BHT (2,6-di-tert-butyl-p-cresol), IRGANOX 1076 (trade name) and IRGANOX 1010 (trade name) manufactured by Ciba-Geigy K. K., ETHYL 330 (trade name) manufactured by Ethyl Corporation, SUMIRISER GM (trade name) manufactured by Sumitomo Chemical Co., Ltd. As the phosphorus type antioxidant, there may be used those of a phosphite ester type and a phosphate ester type.

The polycarbonate resin composition of the present invention may be obtained by blending the above components in a conventional manner and melting and kneading the blend using, for example, a ribbon blender, a Henschel mixer, a Banbury mixer, a drum tumbler, a single screw extruder, a twin screw extruder, a cokneader or a multi-screw extruder. The melting and kneading may be suitably performed at a temperature of generally 250 to 300° C.

In the resin composition of the present invention, which contains a suitable amount of the component (D), it is possible to obtain a polycarbonate resin composition having high fluidity and excellent flame retardancy while preventing melt-drop thereof.

The component (B) as the flame retarding component is uniformly dispersed in the resin composition as primary particles to have a dispersion average particle diameter of 0.1 to 1.0 μm, preferably 0.2 to 0.6 μm. When the dispersion average particle diameter is less than 0.1 μm, the impact resistance becomes insufficient. When the dispersion average particle diameter exceeds 1 μm, the flame retardancy, impact resistance and stiffness are likely to be insufficient.

The resin composition of the present invention may be formed into a thin-walled molded article having excellent flame retardancy by suitable known molding method such as hollow molding, injection molding, extrusion molding, vacuum molding, air pressure molding, hot bending, compression molding, calender molding or rotational molding.

Especially, the resin composition of the present invention is suited for the production of molded bodies having a section with a thickness of 1 mm or less or molded bodies in the form of sheet or film with a thickness of 1 mm or less, which molded bodies are required to exhibit high fluidity during molding thereof and excellent flame retardancy during use thereof.

EXAMPLES

The present invention will be described in more detail below by way of Examples but is not limited to them in any way.

The resin compositions were measured and evaluated for their physical properties by the following methods.

(1) Viscosity average molecular weight (Mv)

A molded article was pulverized and dissolved in a methylene chloride solution. After removal of insoluble matters by filtration, a film was formed by evaporation of the solution. The film was again dissolved in methylene chloride and the solution was measured for its viscosity at 20° C. using a Ubbelohde tube viscometer to determine the intrinsic viscosity [η]. The viscosity average molecular weight (Mv) was then calculated according to the following formula:

$$[\eta] = 1.23 \times 10^{-5} Mv^{0.83}$$

(2) MI (Melt index)

MI was measured in accordance with ASTM Standard D-1238 at 230° C. with 1.2 kg load.

(3) Dispersion particle diameter of flame retardant

A test piece having a thickness of 1/32 inch (0.8 mm) was prepared by an injection molding device. Aggregated portions of the polyorganosiloxane-containing graft copolymer flame retardant were photographed by transmission electron microscopy, from which the dispersion diameters thereof were measured. The measured values were averaged to obtain a mean value.

(4) Flame retardancy

In accordance with UL standard 94, a test piece having a thickness of 1/32 inch was prepared and subjected to a vertical burn test. The results of the test were evaluated and rated as UL94 V-0, V-1 or NG (not-V).

(5) Notch IZOD impact strength (IZOD)

A test piece having a thickness of 3.2 mm (1/8 inch) was prepared by an injection molding device and tested in accordance with ASTM Standard D-256.

(6) Flexural modulus

A test piece having a thickness of 4 mm and a length of 130 mm was prepared by an injection molding device and subjected to a three point bending test with a span of 90 mm and a crosshead speed of 20 mm/min in accordance with ASTM Standard D-790. The flexural modulus was calculated based on the gradient of the load-distortion curve.

Example 1

Ninety five (95) parts by mass of an aromatic polycarbonate resin (A) (Trade name: A1500, manufactured by Idemitsu Kosan Co., Ltd.; viscosity average molecular weight: 14,500) and 5 parts by mass of a polyorganosiloxane-containing graft copolymer flame retardant (B) (Trade name: SFX001, manufactured by Kaneka Corporation) (total of (A) and (B): 100 parts by mass) were uniformly blended with 0.5 part by mass of bisphenol A type epoxy compound (C) (Trade name: EPICLON 4055, manufactured by Dainippon Ink and Chemicals, Incorporated; epoxy equivalent: 900) and 0.5 part by mass of PTFE capable of forming fibrils (D) (Trade name: CD-076, manufactured by Asahi Glass Co., Ltd.) using a tumbler. Each of the above components had been dried before blending. The blend was fed to a vented twin screw extruder (Model: TEM35, manufactured by Toshiba Machine Co., Ltd.), kneaded therein at 280° C., and then pelletized.

The resulting pellets were dried at 120° C. for 10 hours and then molded by injection molding using an injection molding machine (Model: TEM35, manufactured by Toshiba Machine Co., Ltd.), at a cylinder temperature of 280° C. (a cylinder temperature of 320° C. in the case of Example 2 only) and a mold temperature of 80° C. to obtain test pieces having a thickness of 1/32 inch (0.8 mm). Each of the test pieces was measured for various properties. The results are shown in Table 1. The resin composition of Example 1 was found to have a dispersion particle diameter of its flame retardant of as small as 0.3 μm and to show flame retardancy of V-0.

Example 2

Example 1 was performed in the same manner as described except that a different aromatic polycarbonate resin (Trade name: A1900, manufactured by Idemitsu Kosan Co., Ltd.; viscosity average molecular weight: 19,200) was used as the component (A). Using the pellets thus obtained, test pieces were prepared in the same manner as those in Example 1 except that a cylinder temperature of 320° C. was used. The results of the measurement for the test pieces are summarized in Table 1.

Examples 3 and 4

Test pieces were obtained in the same manner as described in Example 1 except that the blending proportion was varied. The results of the measurement for the test pieces are summarized in Table 1.

Comparative Example 1

Test pieces were obtained in the same manner as described in Example 1 except that no epoxy compound was blended. The measurement of the test pieces revealed that the dispersion particle diameter of the flame retardant was as large as 3 μm. Due to aggregation, the flame retardancy was NG and the impact resistance was poor. The results are summarized in Table 1.

Comparative Example 2

Test pieces were obtained in the same manner as described in Example 1 except that the epoxy compound was substituted by 0.5 parts by mass of a novolak type epoxy compound (Trade name: EPICLON N4055, manufactured by Dainippon Ink and Chemicals, Incorporated).

The measurement of the test pieces revealed that the dispersion particle diameter of the flame retardant was as large as 3 μm. The flame retardancy was NG. The results are summarized in Table 1.

Comparative Examples 3 to 5

Test pieces were obtained in the same manner as described in Example 1 except that the amount of the flame retardant was varied. The results are summarized in Table 1.

In Comparative Example 3, the flame retardancy was NG and the impact resistance was poor, though the dispersion particle diameter of the flame retardant was 0.3 μm. In spite of the fact that the flame retardant was used in an amount of 10.5 parts by mass in Comparative Example 4, the flame retardancy was NG. In Comparative Example 5, the flame retardancy was NG and the impact resistance was poor.

TABLE 1

| | | Example | | | | Comparative Example | | | | |
|---|---|---|---|---|---|---|---|---|---|---|
| | | 1 | 2 | 3 | 4 | 1 | 2 | 3 | 4 | 5 |
| Compounding Composition | (A) PC Resin: A1500 | 95 | | 98 | 92 | 95 | 95 | 99.7 | 89.5 | 100 |
| | PC Resin: A1900 | | 95 | | | | | | | |
| | (B) Flame retardant | 5 | 5 | 2 | 8 | 5 | 5 | 0.3 | 10.5 | 0 |
| | (C) Bisphenol A type epoxy resin | 0.5 | 0.5 | 0.1 | 0.5 | | | 0.5 | 0.5 | 0.5 |
| | Novolak type epoxy resin | | | | | | 0.5 | | | |
| | (D) PTFE | 0.5 | 0.5 | 1 | 0.5 | 0.5 | 0.5 | 0.5 | 0.5 | 0.5 |
| Evaluation of Performance | (2) MI (g/10 min) | 38 | 16 | 38 | 35 | 38 | 36 | 38 | 34 | 38 |
| | (3) Dispersion diameter of flame retardant (μm) | 0.3 | 0.3 | 0.3 | 0.6 | 3 | 3 | 0.3 | 1.2 | — |
| | (4) Flame retardancy (1/32 inch) | V-0 | V-1 | V-1 | V-1 | NG | NG | NG | NG | NG |
| | (5) IZOD (J/m) | 50 | 60 | 40 | 65 | 15 | 15 | 20 | 60 | 10 |
| | (6) Flexural modulus (kg/mm$^2$) | 2200 | 2200 | 2250 | 2100 | 2050 | 1950 | 2200 | 1900 | 2200 |

From the results shown in Table 1, it will be understood that the resin compositions of Examples 1 to 4, in which the dispersion particle diameter of the flame retardant is not greater than 2 μm, exhibit flame retardancy of V-0 or V-1, though the thickness of the test pieces is as thin as 0.8 mm.

INDUSTRIAL APPLICABILITY

The aromatic polycarbonate resin composition of the present invention has high flame retardancy, mechanical properties and fluidity and is suited for forming a thin-walled molded article and, thus, is effectively utilized in the fields of, particularly, OA appliances and electric and electronic components in which thin wall thickness, light weight and high flame retardancy are required.

The invention claimed is:

1. An aromatic polycarbonate resin composition, comprising:
(A) 90 to 99.5% by mass of a resin component comprising: an aromatic polycarbonate resin;
(B) 10 to 0.5% by mass of a polyorganosiloxane-containing graft copolymer;
(C) a bisphenol type epoxy compound; and
(D) a fibril forming polytetrafluoroethylene;
wherein
a content of polyorganosiloxane in the polyorganosiloxane-graft copolymer is from 40 to 90 parts per 100 parts of the graft copolymer,
a dispersion average particle diameter of the polyorganosiloxane-containing graft copolymer is from 0.1 to 1.0 μm,
a content of the bisphenol type epoxy compound in 100 parts by mass of (A) and (B) is 0.1 to 5 parts,
a content of the fibril-forming polytetrafluoroethylene is 0.05 to 2 parts in 100 parts by mass of (A) and (B), and
the polycarbonate resin composition contains no halogen or phosphorous flame retardant compound.

2. The aromatic polycarbonate resin composition as recited in claim 1, wherein the aromatic polycarbonate resin (A) has a viscosity average molecular weight of 13,000 to 18,000.

3. A molded article having a section with a thickness of 1 mm or less which is obtained by molding an aromatic polycarbonate resin composition as recited in claim 1.

4. A molded article having a section with a thickness of 1 mm or less which is obtained by molding an aromatic polycarbonate resin composition as recited in claim 2.

5. The aromatic polycarbonate resin composition according to claim 1, wherein a number average molecular weight of the fibril-forming polytetrafluoroethylene as determined from the standard specific gravity thereof is from 500,000 to 15,000,000.

6. The aromatic polycarbonate resin composition according to claim 1, wherein the bisphenol type epoxy compound is at least one selected from the group consisting of a bisphenol A type epoxy compound, a bisphenol F type epoxy compound, a bisphenol S type epoxy compound, a bisphenol AD type epoxy compound and a halogenated derivative thereof.

7. The aromatic polycarbonate resin composition according to claim 1, wherein an epoxy equivalent of the bisphenol type epoxy compound is from 180 to 3,500.

8. The aromatic polycarbonate resin composition according to claim 1, further comprising other synthetic resins, elastomers, inorganic fillers, and additives.

9. The aromatic polycarbonate resin composition according to claim 8, wherein the inorganic filler is at least one selected from the group consisting of glass fibers (GF), glass beads, glass flakes, carbon black, calcium sulfate, calcium carbonate, calcium silicate, titanium oxide, alumina, silica, asbestos, talc, clay, mica and quartz powder.

10. The aromatic polycarbonate resin composition according to claim 8, wherein the additive is at least one selected from the group consisting of an antioxidant, a UV absorbing agent, an external lubricant, a releasing agent, an antistatic agent and a coloring agent.

* * * * *